United States Patent
Iwasa et al.

(10) Patent No.: US 6,823,962 B2
(45) Date of Patent: Nov. 30, 2004

(54) ELECTRIC POWER STEERING SYSTEM

(75) Inventors: Souichi Iwasa, Habikino (JP); Takeshi Izumi, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/607,781

(22) Filed: Jun. 27, 2003

(65) Prior Publication Data

US 2004/0069559 A1 Apr. 15, 2004

Related U.S. Application Data

(62) Division of application No. 10/050,144, filed on Jan. 18, 2002, now Pat. No. 6,629,578.

(30) Foreign Application Priority Data

Jan. 22, 2001 (JP) .......................................... 2001/13415
Feb. 1, 2001 (JP) .......................................... 2001/25767
Feb. 13, 2001 (JP) .......................................... 2001/35676

(51) Int. Cl.$^7$ ............................................... B62D 5/04
(52) U.S. Cl. ...................... 180/444; 74/409; 74/388 PS
(58) Field of Search ................................. 180/444, 443, 180/446; 74/409, 388 PS, 417, 440, 390, 395

(56) References Cited

U.S. PATENT DOCUMENTS

| | | | |
|---|---|---|---|
| 4,784,234 A | | 11/1988 | Naito et al. |
| 5,165,495 A | * | 11/1992 | Fujii ........................ 180/444 |
| 5,213,173 A | | 5/1993 | Konishi et al. |
| 5,743,145 A | | 4/1998 | Terada et al. |
| 6,019,012 A | | 2/2000 | Cartwright |
| 6,155,376 A | | 12/2000 | Cheng |
| 6,460,650 B2 | | 10/2002 | Tsuboi et al. |
| 6,561,306 B2 | * | 5/2003 | Watanabe et al. ........... 180/444 |
| 6,564,898 B2 | * | 5/2003 | Takehara et al. ............ 180/444 |
| 2004/0045386 A1 | * | 3/2004 | Saruwatari et al. ..... 74/388 PS |

FOREIGN PATENT DOCUMENTS

| | | |
|---|---|---|
| EP | 1 016 581 | 7/2000 |
| JP | 03-266772 | 11/1991 |
| JP | 09123927 | 5/1997 |
| JP | 09 193815 | 7/1997 |
| JP | 2000-190855 | 7/2000 |

OTHER PUBLICATIONS

European Search Report, dated Apr. 24, 2002, issued by the European Patent Office, for European Patent Application No. EP 02 00 1511 (2 pages).

* cited by examiner

Primary Examiner—Lesley D. Morris
Assistant Examiner—Tony Winner
(74) Attorney, Agent, or Firm—Smith, Gambrell & Russell, LLP

(57) ABSTRACT

In an electric power steering system, a second bevel gear is allowed to move toward a first bevel gear and is biased by a biasing member toward the first bevel gear thereby to be moved toward the first bevel gear as following the wearing away of these bevel gears.

In an electric power steering system, a support shaft formed with the first bevel gear at its distal end is rotatably supported by a retaining member, which is mounted to a support-shaft housing as allowed to move axially of the support shaft. The retaining member is adjusted for its position relative to the support-shaft housing with respect to the axial direction of the support shaft by means of a retaining member adjuster. The first bevel gear is moved toward the second bevel gear as following the wearing away of these bevel gears.

In an electric power steering system, the support shaft formed with the first bevel gear at its distal end is allowed to move toward the second bevel gear and is biased by the biasing member toward the second bevel gear, so that the first bevel gear is moved toward the second bevel gear according to the wearing away of these bevel gears.

4 Claims, 10 Drawing Sheets

ELECTRIC POWER STEERING SYSTEM

REFERENCE TO RELATED APPLICATION

This application is a division of application Ser. No. 10/050,144 filed on Jan. 18, 2002, now a U.S. Pat. No. 6,629,578 B2 which is relied on and incorporated herein by reference.

BACKGROUND OF THE INVENTION

The present invention relates to an electric power steering system for obtaining a steering assist force for vehicle by means of an electric motor.

Heretofore, there has been proposed the electric power steering system arranged as follows (see, for example, Japanese Unexamined Patent Publication No.2000-190855). Rotation of the electric motor is transmitted to a rotary element enclosing a rack shaft by means of a first bevel gear connected with an output shaft of the motor via a support shaft, and a second bevel gear meshed with the first bevel gear with their axes intersecting each other. Rotary motion of the rotary element is converted into linear motion of the rack shaft by means of a ball screw interposed between the rotary element and the rack shaft. The electric motor is driven into rotation in response to the rotation of a handle thereby supplying a steering assist force to a manual steering force for steering steerable road wheels coupled with the rack shaft.

Unfortunately, however, the conventional electric power steering system may sometimes encounter backlash at a meshing engagement area between the first and second bevel gears due to working precisions or assembly precisions of the first and second bevel gears. The backlash causes so-called rattling noises when a steering wheel is manipulated. The rattling noises may be conveyed to a passenger compartment to discomfort a vehicle operator and passenger.

Hence, there has been proposed an electric power steering system directed to the prevention of the backlash as follows. The electric motor is adapted for eccentric movement relative to a housing of the steering system. The eccentric movement of the electric motor provides adjustment of the position of the first bevel gear relative to the second bevel gear during the assembly of the system, thereby preventing the backlash (see, for example, Japanese Unexamined Patent Publication No.2000-190855).

However, it is quite difficult to avoid the backlash no matter how the adjustment is made during the assembly of the system as a countermeasure against the backlash, because tooth flanks of the bevel gear pair wear away from long-term use. Hence, there exists a need for cumbersome maintenance which includes periodical disassembly of the electric power steering system for backlash adjustment and the like.

As another countermeasure against the backlash, there is a common practice to interpose a shim between opposite surfaces of a support-shaft housing accommodating the support shaft and the first bevel gear and the electric motor in end-to-end relation such that the support shaft and first bevel gear may be axially moved in unison with the output shaft of the electric motor thereby adjusting the degree of meshing engagement between the first bevel gear and the second bevel gear.

In the above operation for backlash adjustment, however, the shimming must be usually repeated over and over again because a proper meshing engagement between these bevel gears cannot be achieved by a single shimming. Furthermore, each shimming involves disassembling the electric motor from the support-shaft housing and assembling the electric motor thereto. This makes the backlash adjustment complicated and cumbersome. In this approach, as well, the tooth flanks of these bevel gears wear away from long-term use of the system and hence, the occurrence of backlash is inevitable.

In addition, if the shimming involves a more than necessary amount of movement of the first bevel gear relative to the second bevel gear, a meshing engagement point between these bevel gears is shifted far away from a predetermined meshing engagement point. This results in the decrease of power transmission efficiency between these bevel gears.

There is another problem that the rotation of the support shaft entails vibrations, which propagate through a bearing to the support-shaft housing to produce noises.

OBJECT OF THE INVENTION

It is an object of the invention to provide an electric power steering system capable of preventing the backlash over an extended period of time.

It is another object of the invention to provide an electric power steering system adapted to facilitate the backlash adjustment.

It is still another object of the invention to provide an electric power steering system adapted to prevent the backlash adjustment from entailing a significant displacement of the meshing engagement point between the first and second bevel gears.

It is yet another object of the invention to provide an electric power steering system essentially obviating the necessity for the backlash adjustment.

It is yet another object of the invention to provide an electric power steering system designed to suppress noises caused by the vibrations of the support shaft.

SUMMARY OF THE INVENTION

An electric power steering system according to a first aspect of the invention comprises: a first bevel gear driven into rotation by an electric motor; a second bevel gear meshed with the first bevel gear with their axes intersecting each other and allowed to move toward the first bevel gear; a biasing member for biasing the second bevel gear toward the first bevel gear; a rack shaft linearly moved thereby steering steerable road wheels; a rotary element rotatably supported by a rack housing via a rolling bearing as enclosing the rack shaft and operating to transmit the rotation of the electric motor via the first bevel gear and the second bevel gear; and a power conversion mechanism formed between the rotary element and the rack shaft for converting the rotary motion of the rotary element to the linear motion of the rack shaft.

According to the electric power steering system of the above construction, even if the bevel gears wear away from long-term use, the second bevel gear is biased by the biasing member into movement toward the first bevel gear as following the wearing away of the gears. This leads to the prevention of the backlash at the meshing engagement area between these bevel gears. Thus, the system does not require the maintenance for preventing the rattling noises and ensures over an extended period of time that the vehicle operator and passenger are not discomforted by the rattling noises.

The electric power steering system may preferably be arranged such that the biasing member is interposed between an outer lateral surface of an outer ring of the rolling bearing and a biasing member seat of the housing opposite from the outer lateral surface, thereby moving the second bevel gear toward the first bevel gear in conjunction with the rotary element.

In this case, the biasing member biases the outer ring of the rolling bearing thereby applying a biasing force to the second bevel gear via the rotary element and moving the second bevel gear toward the first bevel gear in conjunction with the rotary element. This obviates the necessity for a bearing for permitting relative rotation between the biasing member and the rotary element so that the structure of the system is simplified. In this mode, it is preferred that the rack housing comprises a first housing for supporting one end of the rotary element as allowing for the relative axial movement thereof, and a second housing for supporting the other end of the rotary element as inhibiting the relative axial movement thereof, and that a housing adjuster provides for adjustment of the relative axial positions of the first housing and the second housing with respect to the rack shaft. In this mode, the housing adjuster provides the adjustment of the relative axial positions of the first and second housings, thereby providing adjustment of a gap between the outer lateral surface of the outer ring of the rolling bearing and the biasing member seat of the housing opposite from the outer lateral surface of the outer ring. The gap adjustment provides for adjustment of the biasing force on the second bevel gear applied by the biasing member. Thus, the backlash adjustment is facilitated.

An electric power steering system according to a second aspect of the invention comprises: a support shaft integrally rotatably connected with an output shaft of an electric motor; a first bevel gear provided at a distal end of the support shaft; a support-shaft housing accommodating the support shaft and the first bevel gear; a rack shaft linearly moved thereby steering steerable road wheels; a rack housing for supporting the rack shaft as allowing for the linear movement thereof; a second bevel gear meshed with the first bevel gear with their axes intersecting each other; a rotary element rotatably supported by the rack housing as enclosing the rack shaft and operating to transmit the rotation of the electric motor via the first bevel gear and the second bevel gear; a power conversion mechanism formed between the rotary element and the rack shaft for converting the rotary motion of the rotary element to the linear motion of the rack shaft; a retaining member mounted to the support-shaft housing as allowed to move axially of the support shaft for rotatably retaining the support shaft via a bearing; and a retaining member adjuster for adjustment of the position of the retaining member relative to the support-shaft housing with respect to an axial direction of the support shaft.

According to the electric power steering system of the second aspect hereof, the retaining member adjuster provides the adjustment of the position of the retaining member relative to the support-shaft housing with respect to the axial direction of the support shaft, thereby providing the axial movement of the first bevel gear along with the support shaft. Thus, the backlash adjustment for the first and second bevel gears can be done without performing the conventional shimming. As a result, the backlash adjustment is accomplished easily and quickly.

The electric power steering system of the second aspect hereof may be arranged such that a proximal end portion of the support shaft is retained by the retaining member via the bearing, whereas a distal end portion of the support shaft is retained in a manner to be movable toward the second bevel gear and is biased toward the second bevel gear by a biasing member.

In this case, even if the bevel gears wear away from long-term use, the first bevel gear is biased by the biasing member into movement toward the second bevel gear as following the wearing away of the bevel gears. Hence, the wearing away of the bevel gears is prevented from causing the backlash at the meshing engagement area therebetween. Thus, the system does not require the maintenance for preventing the rattling noises, ensuring over an extended period of time that the vehicle operator and passenger are not discomforted by the rattling noises. In this mode, the system may further comprise a joint for pivotally connecting the proximal end portion of the support shaft with the output shaft of the electric motor. This mode is more effective to prevent the backlash because the joint allows for a smooth movement of the first bevel gear toward the second bevel gear.

The electric power steering system of the second aspect hereof may preferably be arranged such that the rack housing comprises a first housing for supporting one end of the rotary element as allowing for the relative axial movement thereof, and a second housing for supporting the other end of the rotary element as inhibiting the relative axial movement thereof, and that a housing adjuster provides for adjustment of the relative axial positions of the first housing and the second housing with respect to the rack shaft.

In this case, the housing adjuster provides the adjustment of the relative axial positions of the first and second housings with respect to the rack shaft, thereby providing the axial movement of the rotary element along with the second bevel gear with respect to the rack shaft for accomplishing adjustment of a meshing engagement point between these bevel gears. Thus is prevented the decrease in power transmission efficiency between these bevel gears.

An electric power steering system according to a third aspect of the invention comprises: a support shaft integrally rotatably connected with an output shaft of an electric motor; a first bevel gear provided at a distal end of the support shaft; a second bevel gear meshed with the first bevel gear with their axes intersecting each other; a rack shaft linearly moved thereby steering steerable road wheels; a rotary element rotatably supported by the rack housing as enclosing the rack shaft and operating to transmit the rotation of the electric motor via the first bevel gear and the second bevel gear; and a power conversion mechanism formed between the rotary element and the rack shaft for converting the rotary motion of the rotary element to the linear motion of the rack shaft; wherein the support shaft is allowed to move toward the second bevel gear and is biased toward the second bevel gear by a biasing member.

According to the electric power steering system of the third aspect hereof, the first bevel gear can be pressed against the second bevel gear because the support shaft is movable toward the second bevel gear and is biased toward the second bevel gear by the biasing member. This essentially negates the need for the backlash adjustment in the system assembly procedure. Even if the bevel gears wear away from long-term use, the first bevel gear is biased by the biasing member into movement toward the second bevel gear as following the wearing away of the bevel gears. This leads to the prevention of the backlash at the meshing engagement area between these bevel gears Thus, the system does not require the maintenance for preventing the rattling noises, ensuring over an extended period of time that the vehicle operator and passenger are not discomforted by the rattling noises.

The electric power steering system of the third aspect hereof may preferably be arranged such that the biasing member is interposed between the support shaft and the output shaft of the electric motor. This facilitates the mounting of the biasing member.

The electric power steering system of the third aspect hereof may preferably be arranged such that an elastically deformable buffer member is interposed between the support shaft and a support-shaft housing supporting the support shaft. In this case, the buffer member is capable of absorbing vibrations caused by the rotation of the support shaft, thus suppressing noises attributable to the vibrations.

The electric power steering system of the third aspect hereof may preferably be arranged such that the rack housing comprises a first housing for supporting one end of the rotary element as allowing for the relative axial movement thereof, and a second housing for supporting the other end of the rotary element as inhibiting the relative axial movement thereof, and that a housing adjuster provides for adjustment of the relative axial positions of the first housing and the second housing with respect to the rack shaft.

In this case, the housing adjuster provides the adjustment of the relative axial positions of the first and second housings with respect to the rack shaft, thereby providing the axial movement of the rotary element along with the second bevel gear with respect to the rack shaft for accomplishing adjustment of a meshing engagement point between these bevel gears. Thus is prevented the decrease in power transmission efficiency between these bevel gears.

DETAILED DESCRIPTION OF THE PREFERRED EMBODIMENTS

The invention will hereinbelow be described with reference to the accompanying drawings illustrating the preferred embodiments thereof.

Figure 1:
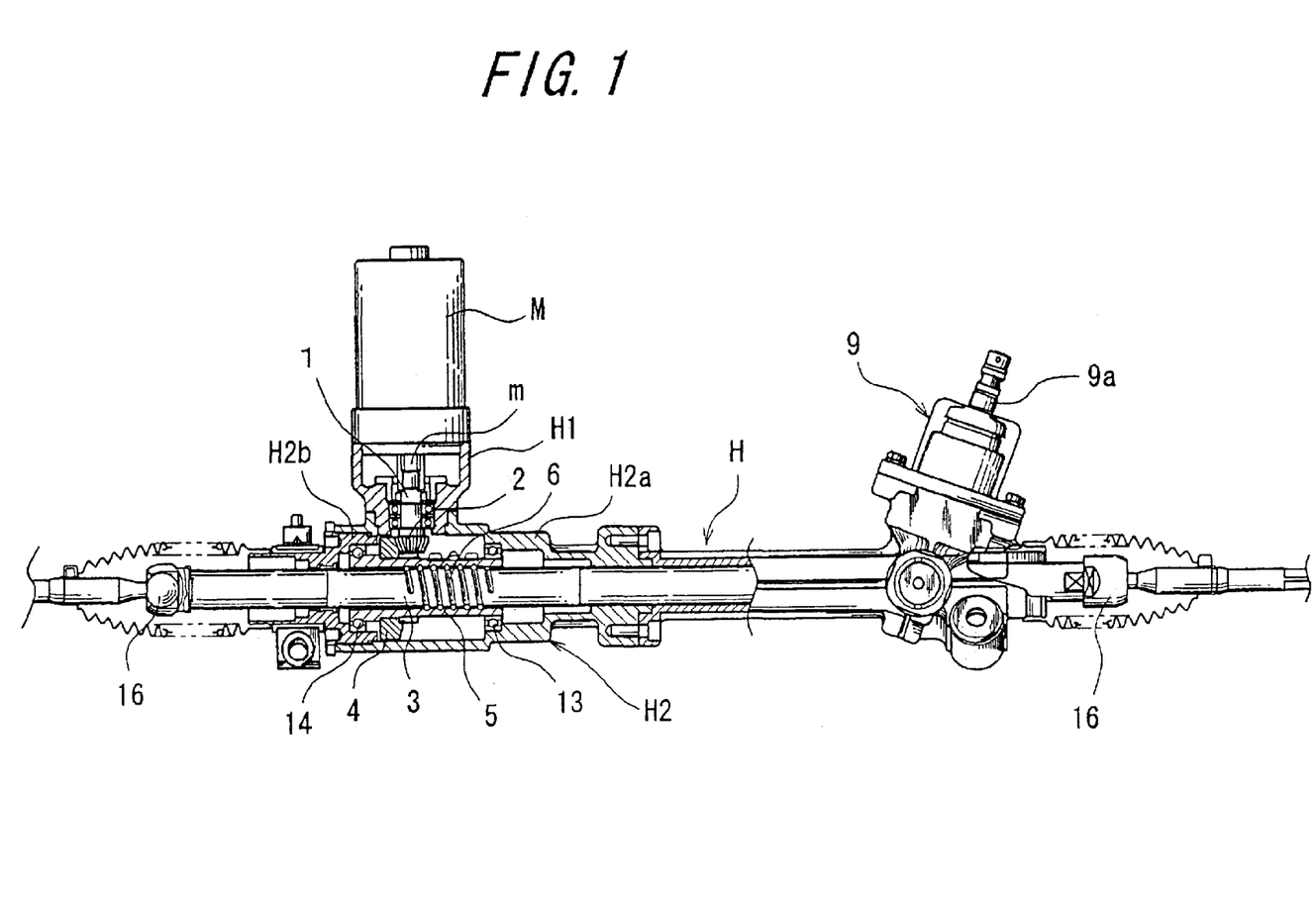
FIG. 1 is a sectional view showing an electric power steering system according to a first aspect of the invention.

FIG. 1 is a sectional view showing one example of an electric power steering system according to a first aspect of the invention. The power steering system essentially includes an elongate housing H, an electric motor M mounted to the housing H, a support shaft 1 driven into rotation by the electric motor M, a first bevel gear 2 integrally formed at a distal end of the support shaft 1, a rack shaft 3 extended through the housing H and linearly moved to steer unillustrated steerable road wheels, a second bevel gear 4 meshed with the first bevel gear 2, a rotary element 5 rotatably supported by the housing H as enclosing the rack shaft 3, a ball screw 6 forming a power conversion mechanism between the rotary element 5 and the rack shaft 3, a biasing member 7 (see FIG. 2) for biasing the second bevel gear 4 toward the first bevel gear 2, and a rack and pinion mechanism 9 for converting the rotation of a handle to a linear motion of the rack shaft 3.

The housing H includes a support-shaft housing H1 mounting the electric motor M and accommodating the support shaft 1, and a rack housing H2 accommodating the rack shaft 3 and the rotary element 5. The rack housing H2 is divided into a first housing H2a for supporting a right-end of the rotary element 5 as seen in the figure, and a second housing H2b for supporting a left end of the rotary element 5 as seen in the figure.

Figure 2:
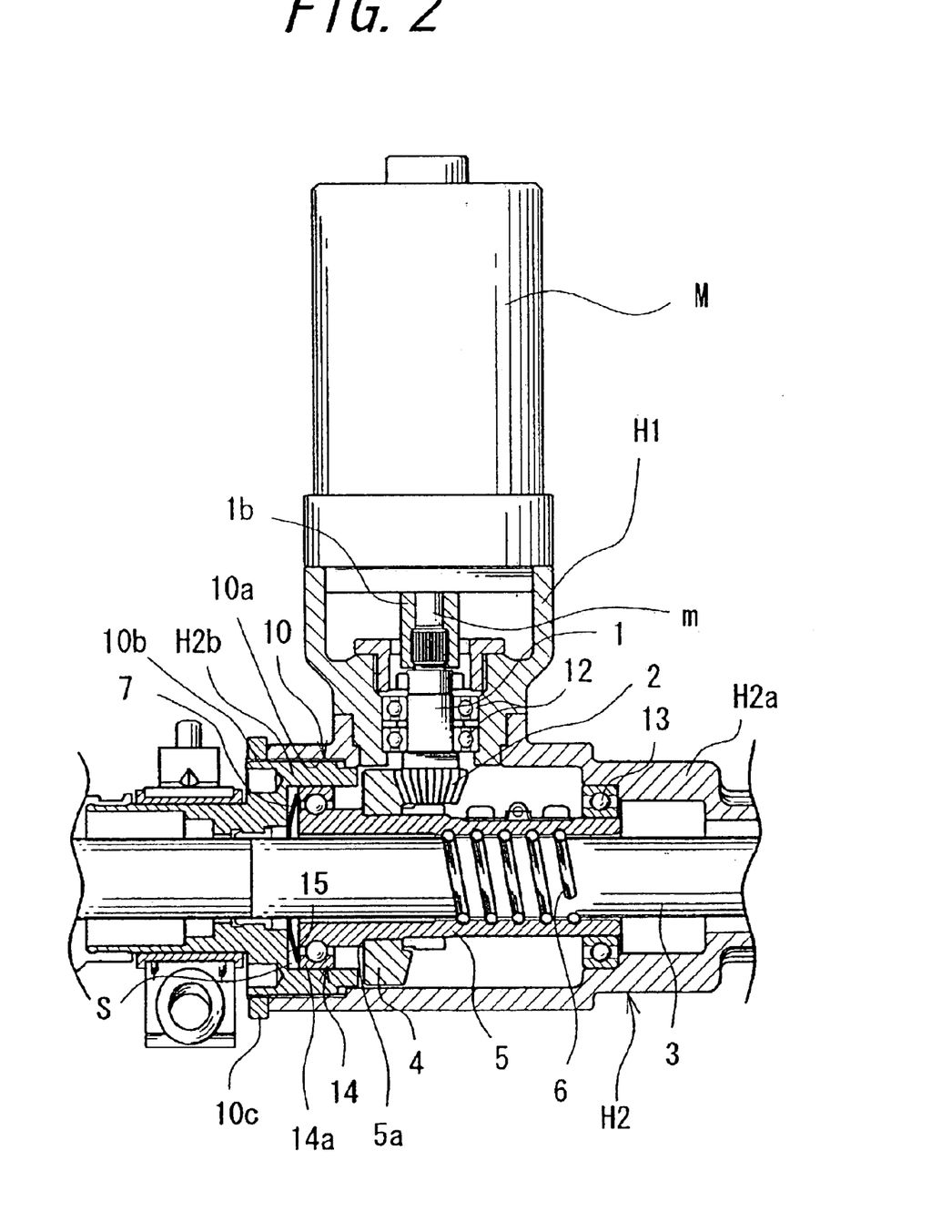
FIG. 2 is an enlarged sectional view showing an essential part of FIG. 1.

Also referring to FIG. 2, the first housing H2a and the second housing H2b are coupled with each other by means of a housing adjuster 10 in a manner to be adjusted for the relative axial positions thereof. The housing adjuster 10 includes an internal thread 10a formed on an inner periphery at a left end of the first housing H2a, an external thread 10b formed on an outer periphery at a right end of the second housing H2b and screwed in the internal thread 10a, and a lock nut 10c screwed on the external thread 10b. The relative axial positions of the first housing H2a and the second housing H2b may be adjusted by adjusting the depth in which the external thread 10b is screwed in the internal thread 10a. With the relative axial positions of these housings thus adjusted, the lock nut 10c may be tightened so as to prevent the relative axial positions of the housings from being shifted.

The support shaft 1 is integrally rotatably mounted to an output shaft m of the electric motor M via a joint 1b. The support shaft 1 has its mid portion rotatably supported by the support-shaft housing H1 via a pair of rolling bearings 12. The support-shaft housing H1 is screwed in the rack housing H2 for interconnection.

The rack shaft 3 is supported by the rack housing H2 as allowed for axial linear movement. The rack shaft 3 has its opposite ends connected with steerable road wheels (not shown) via ball joints 16 and is adapted to steer the road wheels through the linear movement thereof. A right end of the rack shaft 3, as seen in the figure, is formed with a rack gear constituting a part of the rack and pinion mechanism 9.

The second bevel gear 4 is fitted on an outer periphery of the rotary element 5 as inhibited from rotating relative to the rotary element 5 by means of a key or the like. Axes of the second bevel gear 4 and of the first bevel gear 2 intersect at right angles. The second bevel gear 4 is meshed with the first bevel gear 2 as located on the left side of the first bevel gear 2 as seen in the figure.

The rotary element 5 is fitted on an outer periphery of the rack shaft 3 via a gap therebetween. The rotary element 5 has its right end rotatably carried on the first housing H2a via a first rolling bearing 13 and its left end rotatably carried on the second housing H2b via a second rolling bearing 14. The rotary element 5 is formed with a step 5a at a portion rearward of the second bevel gear 4 such as to inhibit the second bevel gear 4 from moving away from the first bevel gear 2 (see FIG. 3).

The first rolling bearing 13 consists of a ball bearing, which serves to retain the rotary element 5 as allowing for the axial movement thereof. The second rolling bearing 14 also consists of a ball bearing, an inner ring of which is defined by the rotary element 5. An outer ring 14a of the second rolling bearing 14 and the second housing H2b are allowed for relative axial movement. Therefore, the rotary element 5 can be moved rightwardly by pushing a left side (outer lateral surface) of the outer ring 14a of the second rolling bearing 14 toward the first bevel gear 2, the rightward movement accompanied by the movement of the second bevel gear 4 toward the first bevel gear 2.

The ball screw 6 is formed between the rotary element 5 and the rack shaft 3 for converting the rotation of the rotary element 5 to the linear motion of the rack shaft 3.

Figure 3:
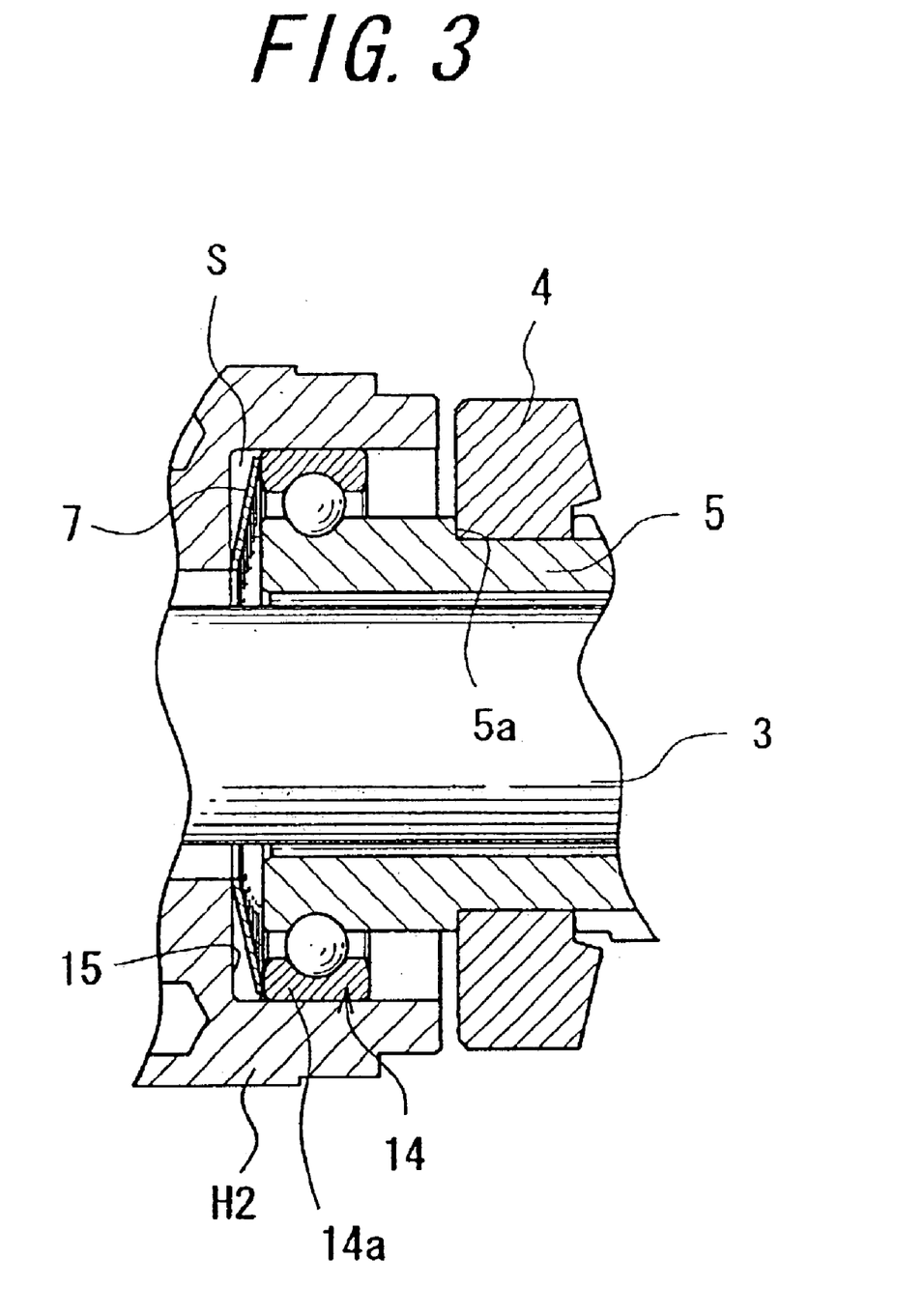
FIG. 3 is an enlarged sectional view showing an essential part of a biasing member.

The biasing member 7 includes a coned disk spring which is interposed between the left side of the outer ring 14a of the second rolling bearing 14 and a spring seat (biasing member seat) 15 formed at place of the second housing H2b as opposing the left side of the outer ring via a gap S therebetween (see FIG. 3). The biasing member 7 is seated in the gap S as resiliently contracted by a predetermined amount thereby constantly biasing the second bevel gear 4 toward the first bevel gear 2 via the second rolling bearing 14 and the rotary element 5. Such an arrangement for biasing the second bevel gear 4 via the second rolling bearing 14 negates the need for an additional bearing for permitting relative rotation between the biasing member 7 and the rotary element 5. Accordingly, the structure of the system may be simplified.

Now referring to FIG. 1, the rack and pinion mechanism 9 includes a steering shaft 9a driven into rotation by the handle (not shown), a pinion gear connected with the steering shaft 9a, and a rack gear meshed with the pinion gear and formed on the rack shaft 3. The mechanism is associated with the rotation of the handle for linearly moving the rack shaft 3. A rotational torque of the steering shaft 9a is sensed by a torque sensor whereas the electric motor M is driven at a power based on the sensed rotational torque for applying a steering assist force to the rack shaft 3.

In the electric power steering system of the above construction, the second bevel gear 4 is resiliently pressed against the first bevel gear 2 by means of the biasing member 7. Therefore, even if the bevel gears 2, 4 wear away from long-term use, the second bevel gear 4 along with the rotary element 5 are driven by the biasing member 7 into movement toward the first bevel gear 2 in a manner to follow the wearing away of these bevel gears. This ensures a long-term prevention of the occurrence of backlash at the meshing engagement area between these bevel gears 2, 4.

On the other hand, the housing adjuster 10 provides adjustment of the relative axial positions of the first housing H2a and the second housing H2b, thereby accomplishing adjustment of a distance (gap S) between the second rolling bearing 14 and the spring seat 15. The gap adjustment provides for adjustment of the biasing force that the biasing member 7 applies to the second bevel gear 4. During the assembly of the system, therefore, a torque required for forcing the second housing H2b into the first housing H2a, for example, may be sensed such that the second bevel gear 4 may be meshed with the first bevel gear 2 at a proper contact pressure. This facilitates the backlash adjustment.

Various modifications may be made to the design of the electric power steering system according to the first aspect of the invention. For instance, the second bevel gear 4 may be axially movably mounted to the rotary element 5 whereas the biasing member 7 may be disposed on the rear side of the second bevel gear 4 for directly biasing the second bevel gear 4. The first bevel gear 2 and the second bevel gear 4 may have their axes diagonally intersecting each other rather than intersecting at right angles. The power conversion mechanism may employ a bearing nut instead of the ball screw 6.

Figure 4:
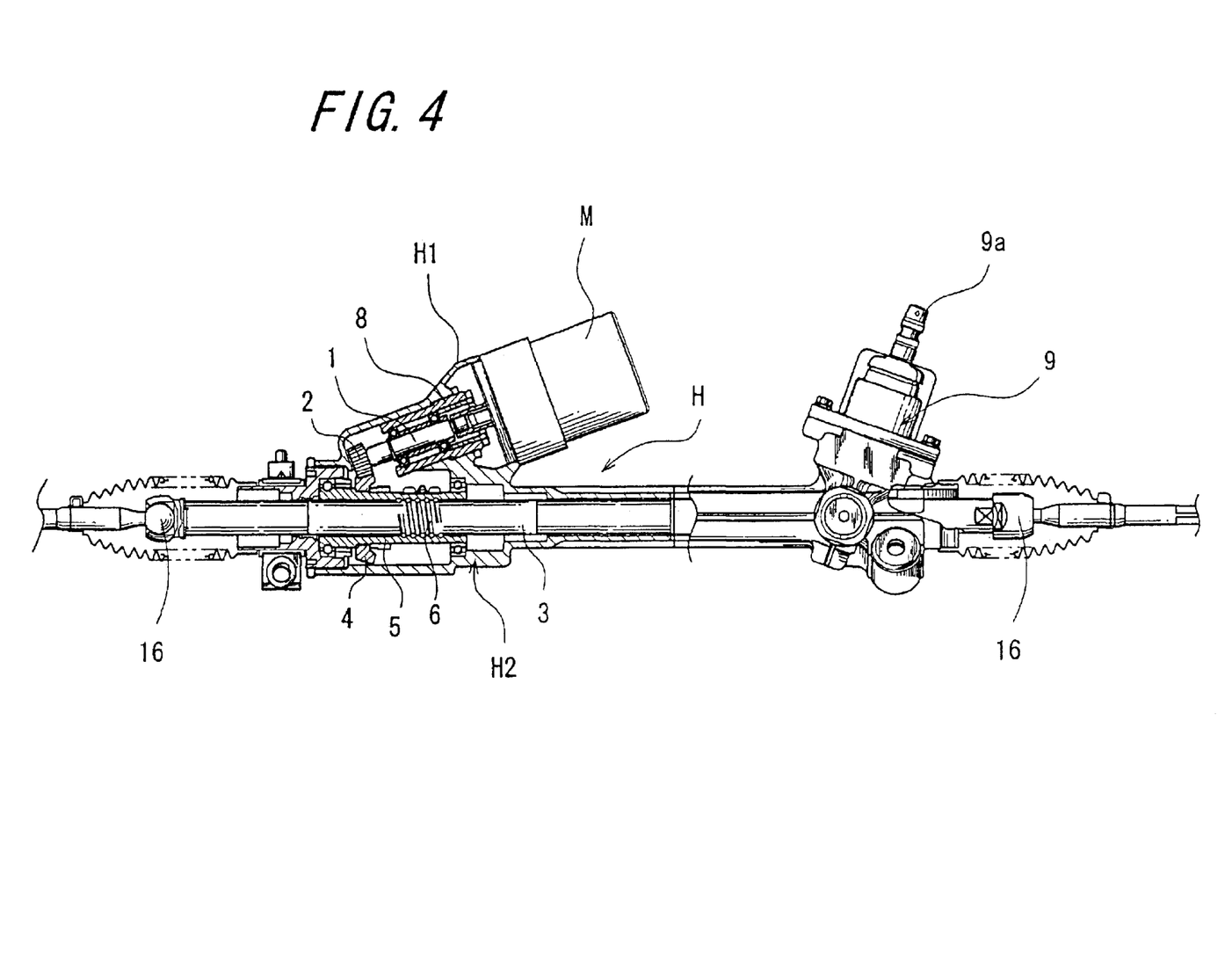
FIG. 4 is a sectional view showing an electric power steering system according to a second aspect of the invention.

FIG. 4 is a sectional view showing an electric power steering system according to a second aspect of the invention. Likewise to the system shown in FIG. 1, this electric power steering system includes the housing H, the electric motor M mounted to the housing H, the support shaft 1 driven into rotation by the electric motor M, the first bevel gear 2 provided at the distal end of the support shaft 1, the rack shaft 3 extended through the housing H and linearly moved to steer the unillustrated steerable road wheels, the second bevel gear 4 meshed with the first bevel gear 2, the rotary element 5 rotatably supported by the housing H as enclosing the rack shaft 3, and the ball screw 6 formed between the rotary element 5 and the rack shaft 3. The system further includes a retaining member 8 which is specific to this embodiment and serves to retain the support shaft 1.

Figure 5:
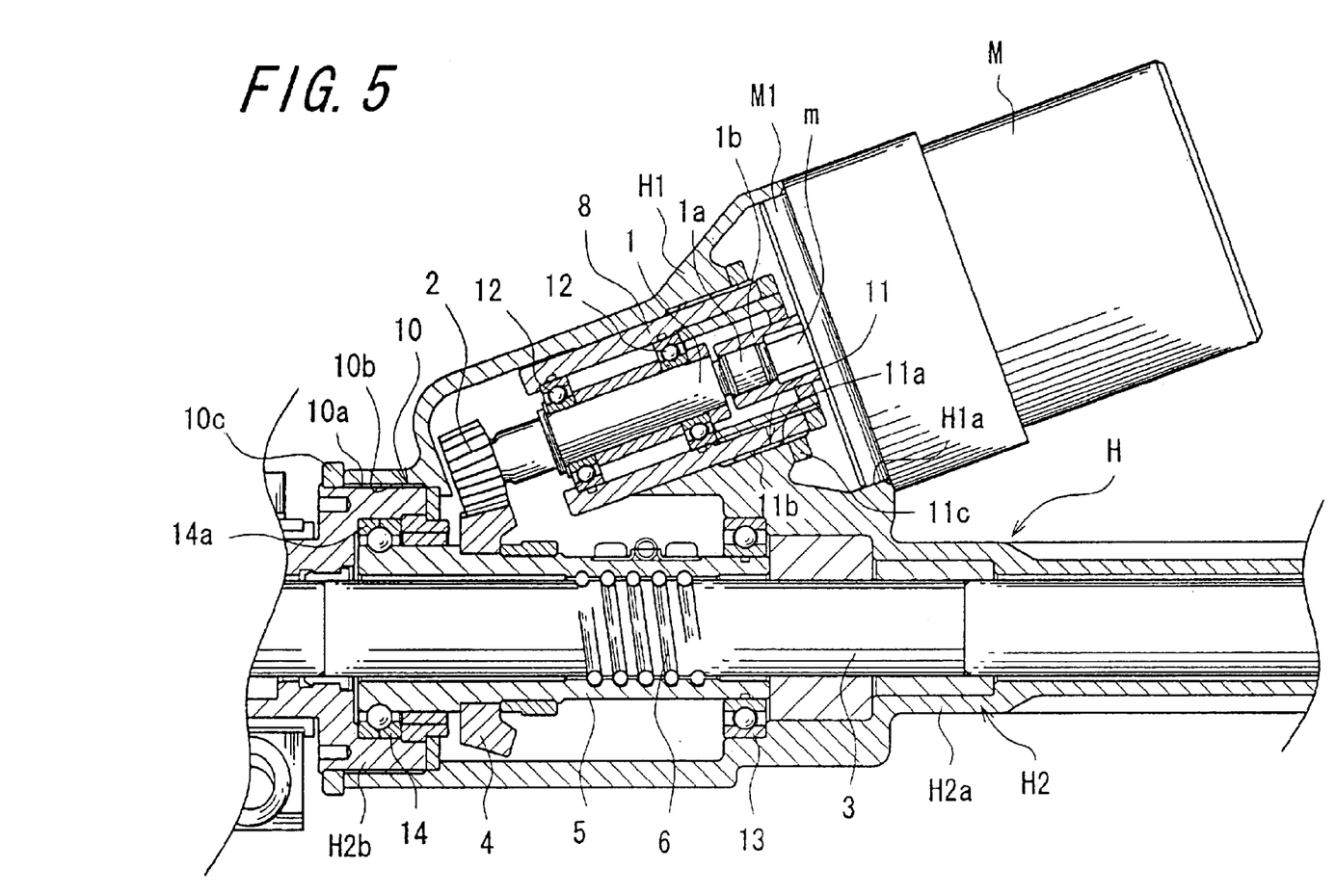
FIG. 5 is an enlarged sectional view showing an essential part of FIG. 4.

Now also referring to FIG. 5, the housing H includes the support-shaft housing H1 and the rack housing H2 similarly to the system of FIG. 1. The rack housing H2 is divided into the first housing H2a and the second housing H2b. The first housing H2a and the second housing H2b are coupled with each other via the housing adjuster 10 in a manner to be adjusted for the relative axial positions thereof, the housing adjuster 10 having the same construction as that shown in FIG. 1. In this embodiment, the first housing H2a and the support-shaft housing H1 are formed in one piece.

The electric motor M is fixed to the support-shaft housing H1 in a manner that a casing of the motor is fitted in an opening edge H1a of the support-shaft housing H1 at an outer periphery M1 of a front end thereof. An axis of the output shaft m of the electric motor M forms an acute angle with respect to the axis of the rack shaft 3.

The support shaft 1 has its proximal end 1a integrally rotatably mounted to the output shaft m of the electric motor M via the joint 1b. An axis of the support shaft 1 is positioned on an extension of the axis of the output shaft m of the electric motor M. The mid portion of the support shaft 1 is rotatably carried by the retaining member 8 via a pair of rolling bearings 12.

The retaining member 8 is of a cylinder shape, an outer periphery of which is slidably fitted in, an inner periphery of the support shaft housing H1. A retaining member adjuster 11 allows for relative axial movement of the retaining member 8 and the support-shaft housing H1 with respect to an axis of the support shaft 1. The retaining member adjuster 11 includes an internal thread 11a formed on an inner periphery at a right end of the support-shaft housing H1, an external thread 11b formed on an outer periphery at a right end of the retaining member 8, and a lock nut 11c screwed on the external thread 11b. The relative positions of the support-shaft housing H1 and the retaining member 8 with respect to the axis of the support shaft can be adjusted by adjusting the depth in which the external thread 11b is screwed in the internal thread 11a. With the relative positions of the support-shaft housing and the retaining member thus adjusted, the lock nut 11c may be tightened whereby the housing and the retaining member are prevented from being axially displaced relative to each other.

The second bevel gear 4 is securely fitted on the outer periphery of the rotary element 5, thus inhibited from rotating or axially moving relative to the rotary element 5.

The axis of the second bevel gear 4 is aligned with the axis of the rack shaft 3, whereas the first bevel gear 2 is meshed with the teeth on the outer periphery of the second bevel gear 4 as allowed to move along its axis.

The rotary element 5 is fitted on the outer periphery of the rack shaft 3 via a gap therebetween. The rotary element 5 has its right end rotatably carried on the first housing H2a via the first rolling bearing 13 and its left end rotatably carried on the second housing H2b via the second rolling bearing 14.

The first rolling bearing 13 consists of a ball bearing, which serves to retain the rotary element 5 as allowing for the axial movement of the rotary element 5. The second rolling bearing 14 consists of a ball bearing, the outer ring 14a of which and the second housing H2b are inhibited from axially moving relative to each other. Therefore, the rotary element 5 can be moved axially by moving the second housing H2b along the axis of the rack shaft 3, the axial movement of the rotary element 5 accompanied by the axial movement of the second bevel gear 4.

In the electric power steering system of the above construction, prior to the mounting of the electric motor M to the support-shaft housing H1, the retaining member 8 with the lock nut 11c of the retaining member adjuster 11 loosened may be turned for movement along the axis of the support shaft 1 thereby moving the support shaft 1 and, the first bevel gear 2 axially. This provides the backlash adjustment for the meshing engagement area between the bevel gears 2, 4. Accordingly, the electric motor M need not be assembled/disassembled to/from the support-shaft housing H1 over and over again and besides, the backlash adjustment is facilitated.

If the backlash adjustment requires the first bevel gear 2 to be axially moved over a great distance, the housing adjuster 10 may be used for axially moving the second bevel gear 4 along with the second housing H2b and the rotary element 5 for adjustment thereby decreasing the movement of the first bevel gear 2 for adjustment. This is effective to prevent the decrease in the power transmission efficiency between the first bevel gear 2 and the second bevel gear 4 which results from the meshing engagement point therebetween shifted far away from the predetermined meshing engagement point.

Figure 6:
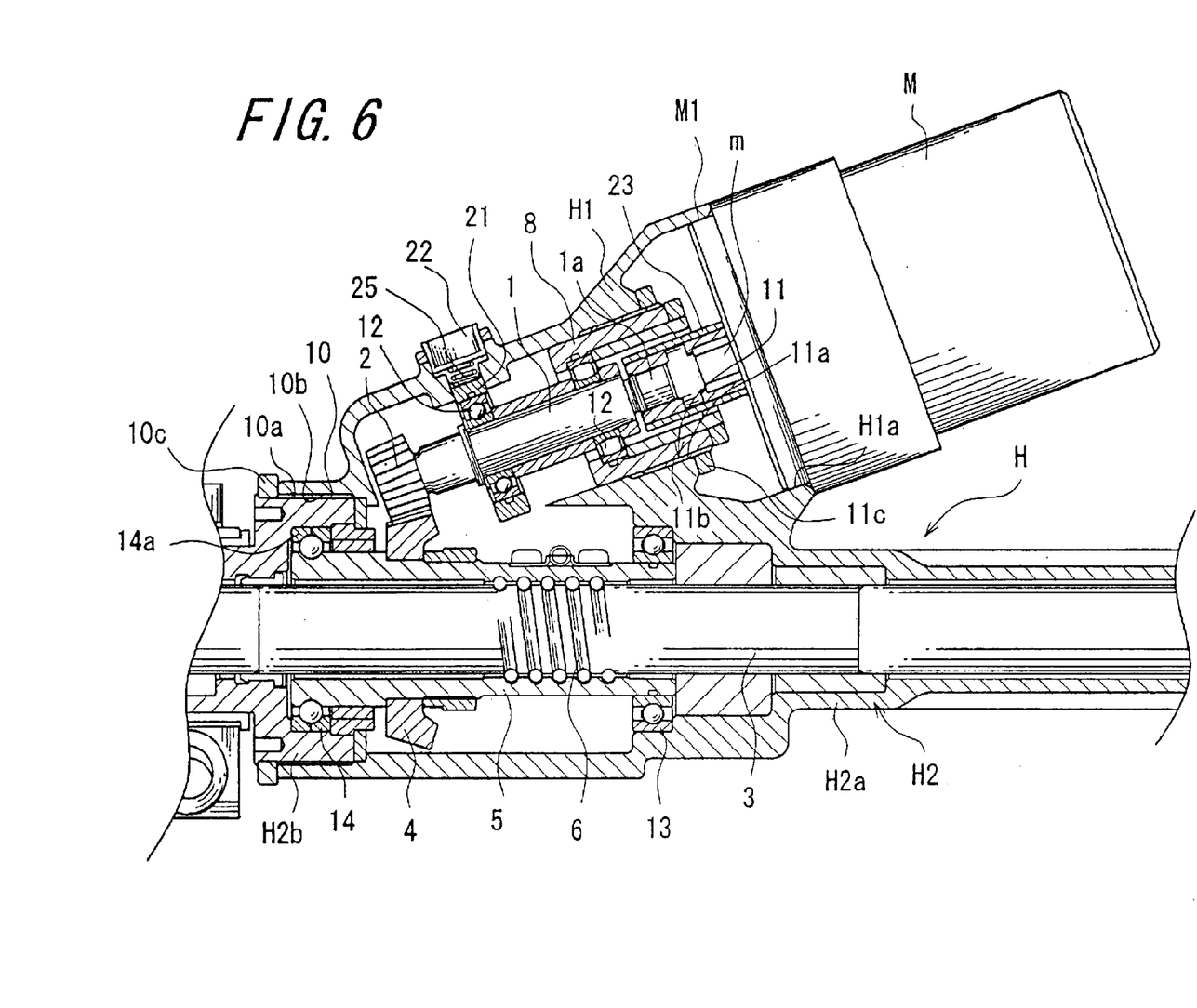
FIG. 6 is an enlarged sectional view showing an essential part of another embodiment.

FIG. 6 is a sectional view showing an essential part of another embodiment. In this embodiment, only the proximal end 1a of the support shaft 1 is retained by the retaining member 8 via one of the rolling bearings 12, whereas the distal end of the support shaft 1 is retained in a manner to be movable (inclinable) toward the second bevel gear 4 and biased by a biasing member 25 toward the second bevel gear 4.

The retaining member 8 for retaining the proximal end 1a of the support shaft 1 is formed of a cylinder body having a shorter overall length than the retaining member 8 shown in FIG. 5. The rolling bearing 12 interposed between the retaining member 8 and the support shaft 1 consists of a self-aligning bearing. On the other hand, the distal end of the support shaft 1 is rotatably retained by a retainer ring 21 via the other rolling bearing 12 which consists of a ball bearing. The retainer ring 21 is mounted to the support-shaft housing H1 as allowed to move substantially perpendicularly to the axis of the support shaft 1. A gap is defined between an inside circumference of an inner ring of this rolling bearing 12 and the support shaft 1 for permitting the axial movement of the support shaft 1. The proximal end 1a of the support shaft 1 is pivotally connected with the output shaft m of the electric motor M via a joint 23. The joint 23 is formed of a cylindrical rubber coupling.

The above arrangement permits the support shaft 1 to smoothly pivot about its proximal end 1a to incline with respect to the axis of the output shaft m. It is noted that the inclination of the axis of the support shaft 1 relative to the axis of the rolling bearing 12 supporting the distal end of the support shaft 1 is accommodated by radial and thrust clearances of the rolling bearing 12.

The biasing member 25 consists of a helical compression spring, which is interposed between a cap 22 forced in the support-shaft housing H1 and the retainer ring 21 as resiliently contracted.

According to this embodiment, the first bevel gear 2 can be resiliently pressed against the second bevel gear 4 because the distal end of the support shaft 1 is inclinable and is constantly biased toward the second bevel gear 4 by the biasing member 25. Hence, even if the bevel gears 2, 4 wear away from long-term use, the first bevel gear 2 can be moved toward the second bevel gear 4 in a manner to follow the wearing away of the bevel gears. As a result, it is ensured over an extended period of time that the backlash at the meshing engagement area between the bevel gears 2, 4 is prevented.

It is noted that the electric power steering system according to the second aspect of the invention is also applicable to the electric power steering system wherein the axes of the first bevel gear 2 and the second bevel gear 4 intersect at right angles rather than at acute angles.

Figure 7:
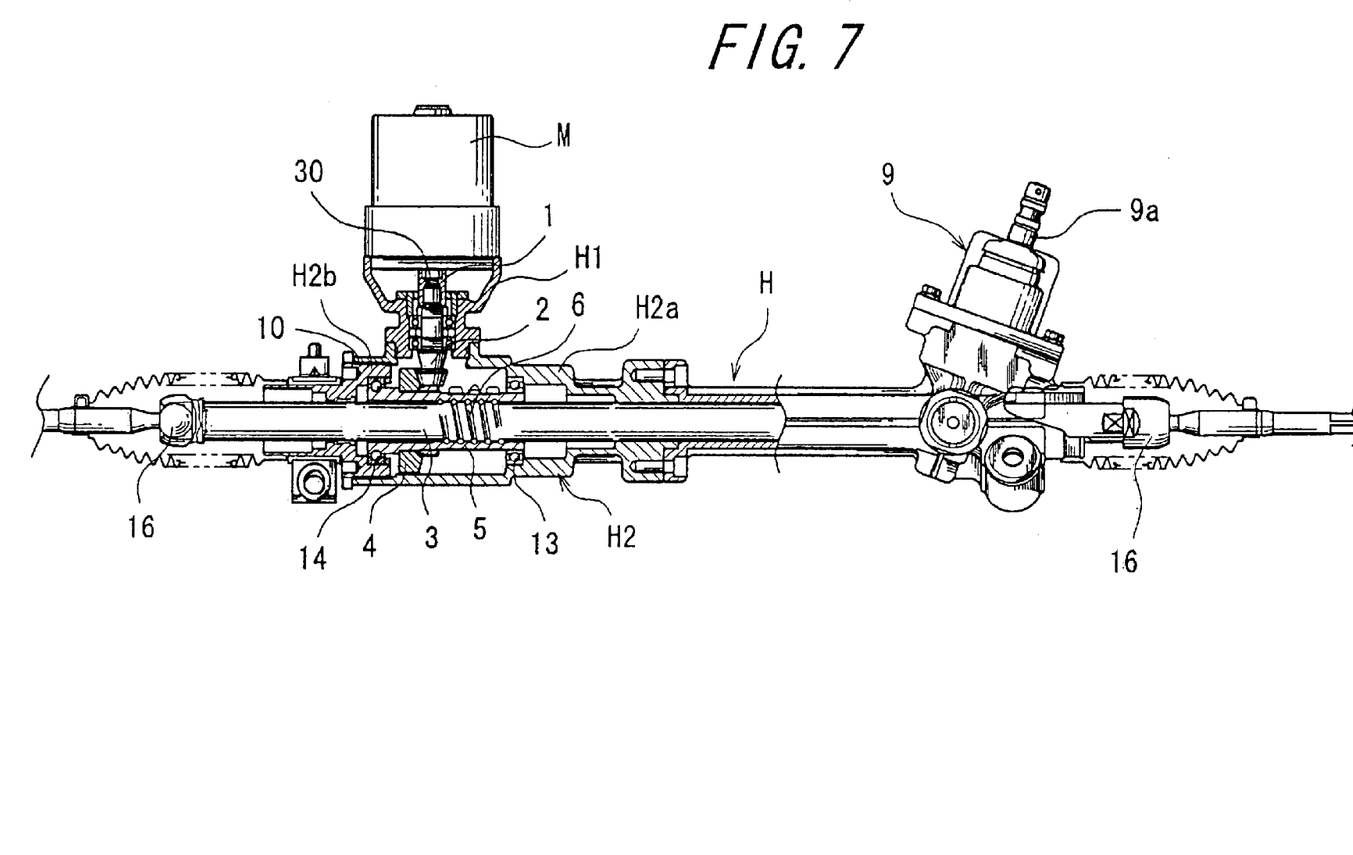
FIG. 7 is a sectional view showing an electric power steering system according to a third aspect of the invention.

FIG. 7 is a sectional view showing an electric power steering system according to a third aspect of the invention. Likewise to the system shown in FIG. 1, the electric power steering system includes the housing H, the electric motor M mounted to the housing H, the support shaft 1 driven into rotation by the electric motor M, the first bevel gear 2 provided at the distal end of the support shaft 1, the rack shaft 3 extended through the housing H and linearly moved to steer the unillustrated steerable road wheels, the second bevel gear 4 meshed with the first bevel gear 2, the rotary element 5 rotatably supported by the housing H as enclosing the rack shaft 3, and the ball screw 6 formed between the rotary element 5 and the rack shaft 3. The system further includes a biasing member 30 which is specific to this embodiment and serves to bias the support shaft 1 toward the second bevel gear 4.

Figure 8:
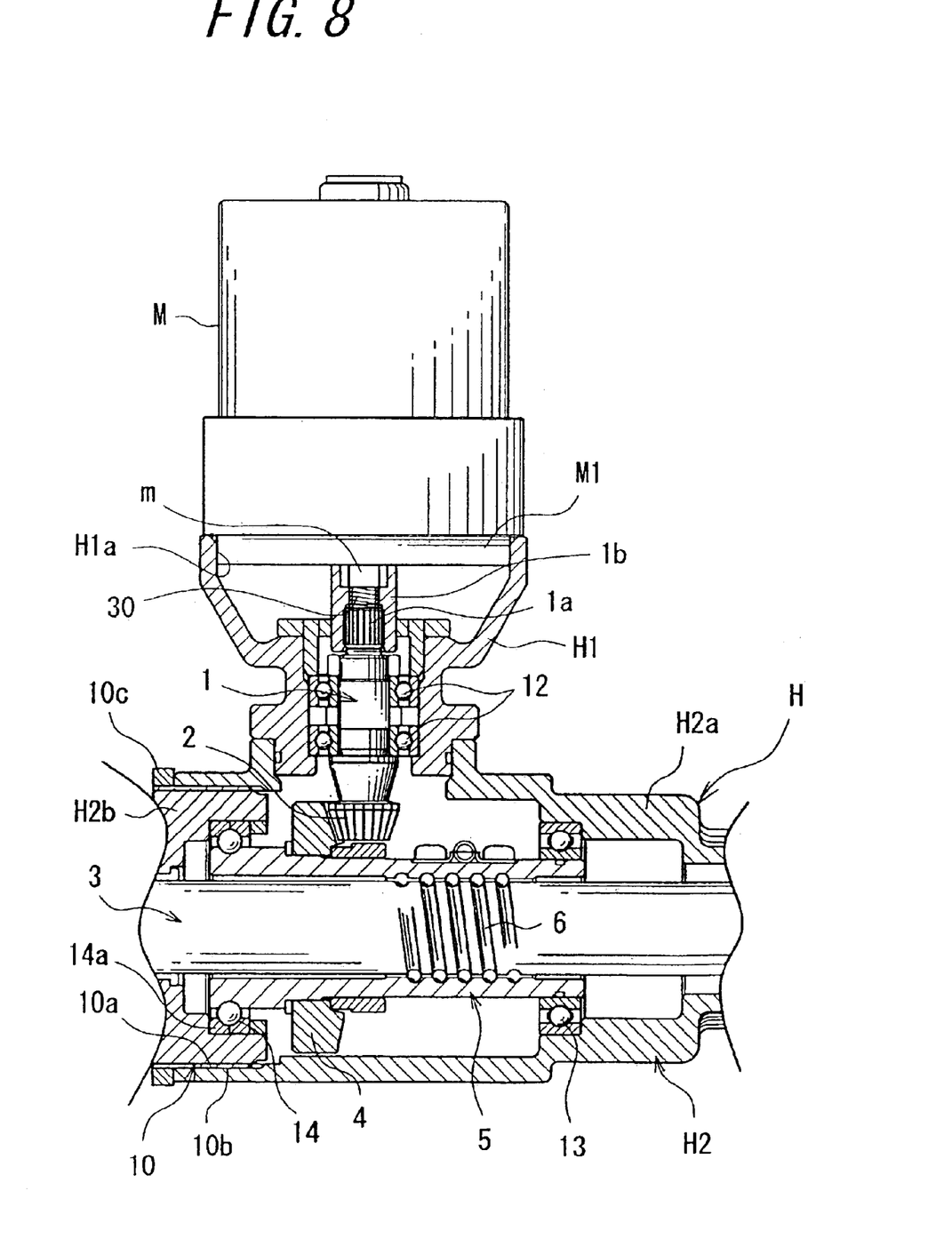
FIG. 8 is an enlarged sectional view showing an essential part of FIG. 7.

Also referring to FIG. 8, the housing H includes the support-shaft housing H1 and the rack housing H2 similarly to that shown in FIG. 1. The rack housing H2 is divided into the first housing H2a and the second housing H2b. The first housing H2a and the second housing H2b are coupled with each other via the housing adjuster 10 of the same construction as that shown in FIG. 1 in a manner to be adjusted for the relative axial positions thereof.

The electric motor M is fixed to the support-shaft housing H1 in a manner that the casing of the motor is fitted in the opening edge H1a of the housing H1 at an outer periphery M1 of the front end thereof. The axis of the output shaft m of the electric motor M intersects the axis of the rack shaft 3 at right angle.

The support shaft 1 has its proximal end 1a integrally rotatably mounted to the output shaft m of the electric motor M via the joint 1b. The axis of the support shaft 1 is positioned on the extension of the axis of the output shaft m of the electric motor M. The mid portion of the support shaft 1 is rotatably carried by the support-shaft housing H1 via a pair of rolling bearings 12. The bearing pair 12 allow for the axial movement of the support shaft 1.

Figure 10:
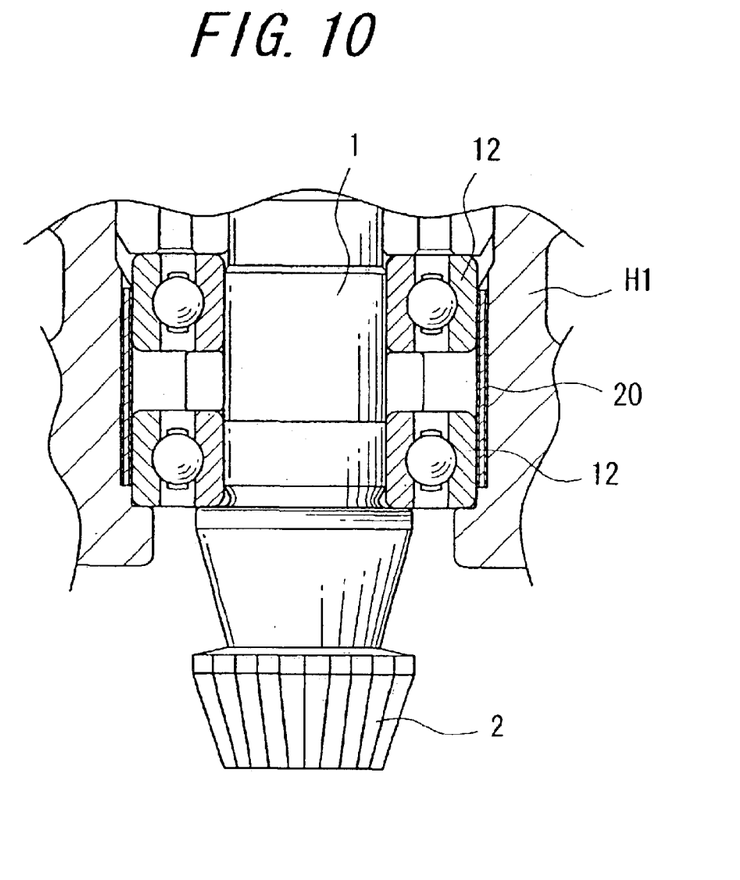
FIG. 10 is an enlarged sectional view showing a structure for mounting a support shaft.
Figure 11:
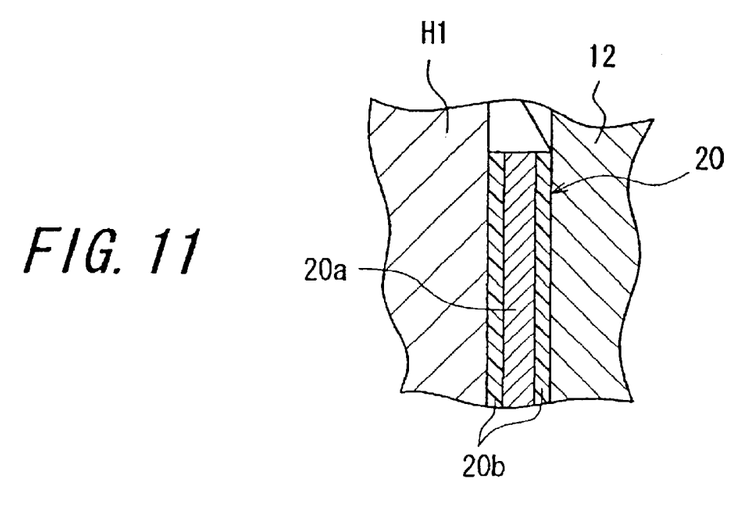
FIG. 11 is an enlarged sectional view showing an essential part of soft metal.

A soft metal 20 as a buffer member is interposed between the bearing pair 12 and the support-shaft housing H1 (see FIG. 10). The soft metal 20 includes a cylindrical core 20a, outer and inner peripheries of which are covered with a rubber material 20b (see FIG. 11) so that the soft metal is capable of being elastically deformed radially. The soft metal 20 is capable of suppressing noises by absorbing vibrations caused by the rotation of the support shaft 1. Furthermore, the soft metal is adapted to allow for the inclination and eccentricity of the support shaft 1 with respect to the axis of the output shaft m of the electric motor M, thereby ensuring a smooth rotation of the support shaft 1.

The joint 1b is of a cylinder shape. The joint 1b has an inner periphery of its upper portion press-fitted on the output shaft m-of the electric motor M, while fittedly receiving the proximal end 1a of the support shaft 1 in the inner periphery of its lower portion via a serration in a manner to allow for the axial movement of the support shaft.

Figure 9:
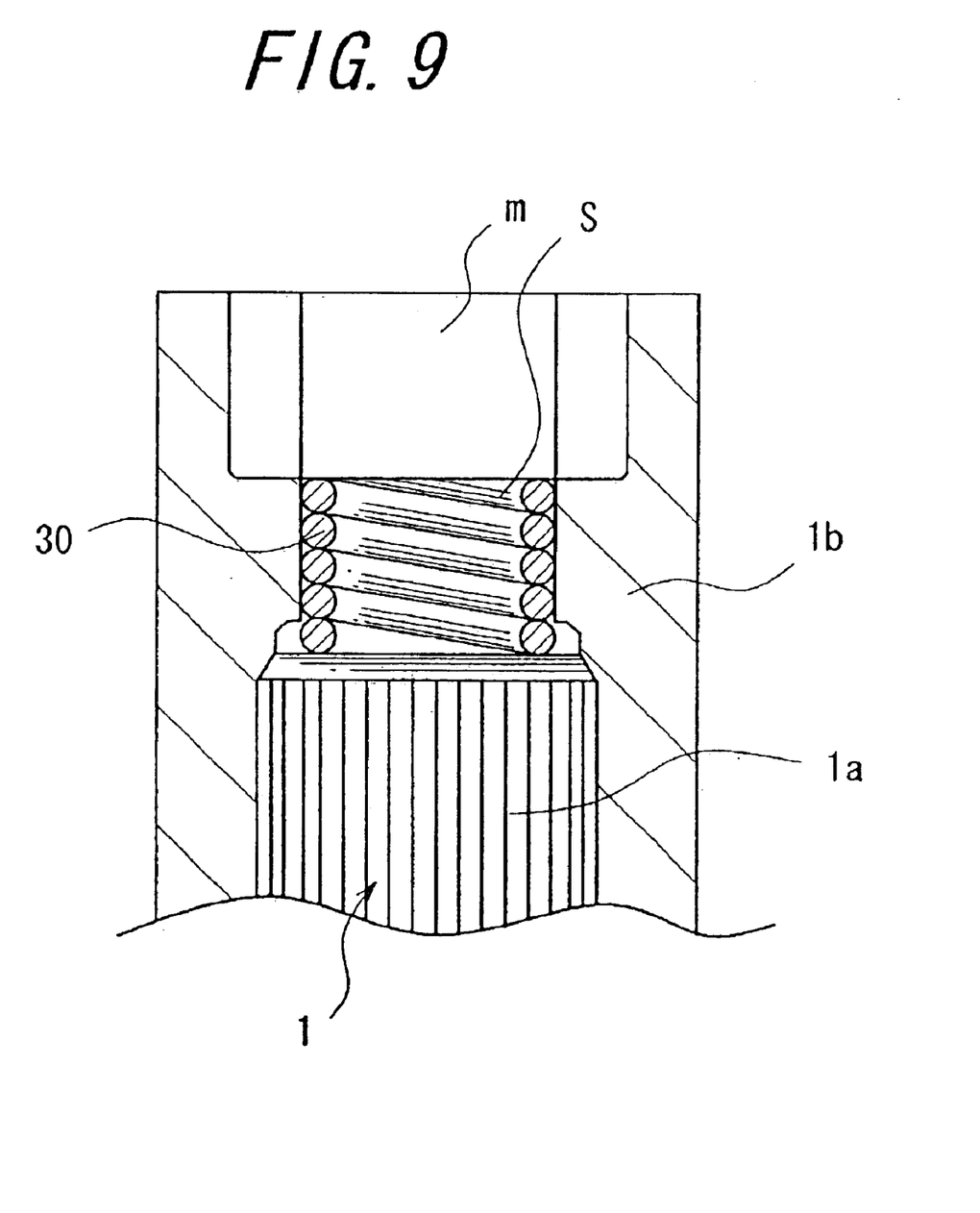
FIG. 9 is an enlarged sectional view showing an essential part of FIG. 8.

Within the joint 1b, a predetermined gap S is defined between an end surface of the output shaft m of the electric motor M and an end surface of the proximal end 1a of the support shaft 1. The biasing member 30 is disposed in the gap S (see FIG. 9). The biasing member 30 consists of a helical compression spring which is interposed between the end surface of the output shaft m of the electric motor M and the end surface of the proximal end 1a of the support shaft 1 in a manner to be resiliently contracted. Hence, the support shaft 1 along with the first bevel gear 2 are constantly biased toward the second bevel gear 4 by means of the biasing member 30. Since the biasing member 30 is interposed between the support shaft 1 and the output shaft m, it is easy to mount the biasing member 30. More specifically, if one end of the biasing member 30 is received by a stationary part such as the support-shaft housing H1, a thrust bearing is required for permitting the relative rotation between the received end of the biasing member and the stationary part so that the structure of the system is more complicated. In contrast, the biasing member 30 interposed between the support shaft 1 and the output shaft m as rotating parts obviates the necessity for the thrust bearing, so that the structure of the system is simplified.

The second bevel gear 4 is securely fitted on the outer periphery of the rotary element 5, thus inhibited from rotating or axially moving relative to the rotary element 5. The axis of the second bevel gear 4 is aligned with the axis of the rack shaft 3, whereas the first bevel gear 2 is meshed with the teeth of the second bevel gear 4 as allowed to move along its axis.

The rotary element 5 is fitted on the outer periphery of the rack shaft 3 via a gap therebetween. The rotary element 5 has its right end rotatably carried on the first housing H2a via the first rolling bearing 13 and its left end rotatably carried on the second housing H2b via the second rolling bearing 14.

The first rolling bearing 13 consists of a ball bearing, which serves to retain the rotary element 5 as allowing for the axial movement of the rotary element 5. The second rolling bearing 14 also consists of a ball bearing, an inner ring of which is defined by the rotary element 5. The outer ring 14a of the second rolling bearing 14 and the second housing H2b are inhibited from axially moving relative to each other. Therefore, the second housing H2b may be moved axially of the rack shaft 3 thereby bringing the rotary element 5 into axial movement, which is accompanied by the axial movement of the second bevel gear 4.

In the electric power steering system of the above construction, the first bevel gear 2 can be constantly pressed against the second bevel gear 4 because the support shaft 1 is biased by the biasing member 30 as allowed to move toward the second bevel gear 4. Hence, the backlash adjustment for the meshing engagement area between the bevel gears 2, 4 is automatically accomplished when the system is assembled. This essentially negates the need for the backlash adjustment. However, there may be a case where the amount of movement for backlash adjustment is so great relative to some assembly precisions that there may arise a need for performing shimming in parallel. In this case, the backlash adjustment may be accomplished by rough shimming and hence, the backlash adjustment is facilitated.

Where the first bevel gear 2 is to be moved toward the second bevel gear 4 over a great distance in order to eliminate the backlash, the amount of movement of the first bevel gear 2 may be decreased by axially moving the second bevel gear 4 along with the second housing H2b and the rotary element 5 for adjustment by means of the housing adjuster 10. This is effective to prevent the decrease in the power transmission efficiency between the first bevel gear 2 and the second bevel gear 4 which results from the meshing engagement point therebetween shifted far away from the predetermined meshing engagement point.

Various modifications may be made to the design of the electric power steering system according to the third aspect of the invention. For instance, the soft metal 20 as the buffer member may be replaced by a rubber sleeve. The buffer member may be interposed between the support shaft 1 and the rolling bearings 12.

It is noted that the third aspect of the invention is applicable to the electric power steering system of the type wherein the first bevel gear 2 and the second bevel gear 4 have their axes intersecting each other at acute angles rather than at right angles.

What is claimed is:

1. An electric power steering system comprising:

a support shaft integrally rotatably connected with an output shaft of an electric motor;

a first bevel gear, including a first axis, provided at a distal end of the support shaft;

a second bevel gear, including a second axis, meshed with the first bevel gear with the axes intersecting each other;

a rack shaft linearly moved thereby steering steerable road wheels;

a rotary element rotatably supported by the rack housing as enclosing the rack shaft and operating to transmit the rotation of the electric motor via the first bevel gear and the second bevel gear; and a power conversion mechanism formed between the rotary element and the rack shaft for converting the rotary motion of the rotary element to the linear motion of the rack shaft;

wherein the support shaft is allowed to move toward the second bevel gear and is biased toward the second bevel gear by a biasing member.

2. The electric power steering system as claimed in claim 1, wherein the biasing member is interposed between the support shaft and the output shaft of the electric motor.

3. The electric power steering system as claimed in claim 1, wherein an elastically deformable buffer member is interposed between the support shaft and a support-shaft housing supporting the support shaft.

4. The electric power steering system as claimed in claim 1, wherein the rack housing comprises a first housing for supporting one end of the rotary element as allowing for the relative axial movement thereof, and a second housing for supporting the other end of the rotary element as inhibiting the relative axial movement thereof, and wherein a housing adjuster provides for adjustment of the relative axial positions of the first housing and the second housing with respect to the rack shaft.

* * * * *